Patented Mar. 6, 1951

2,544,393

UNITED STATES PATENT OFFICE 2,544,393

ISOPROPENYLBIPHENYL COPOLYMERS

David T. Mowry, Dayton, Ohio, and Raymond B. Seymour, Brunswick, N. J., assignors to Monsanto Chemical Company, St. Louis, Mo., a corporation of Delaware No Drawing. Application January 25, 1949, Serial No. 72,746

5 Claims. (Cl. 260—80.7)

This invention relates to new and improved synthetic rubber compositions. More particularly the invention relates to novel copolymers of isopropenylbiphenyl and hydrocarbon dienes.

Synthetic rubbers made by the copolymerization of hydrocarbon dienes, for example butadiene, and various aromatic hydrocarbons having unsaturated aliphatic substituents, for example styrene, are well known to the art. Many of these known copolymers resemble natural rubber superficially but also have properties which make them undesirable in specific applications. The conventional synthetic rubber compositions show a serious reduction in tensile strength at elevated temperatures and relatively low elongations, especially at elevated temperatures.

The primary purpose of this invention is to prepare new synthetic rubber compositions having physical properties superior to those of the conventional butadiene-styrene rubber. A further purpose of this invention is to prepare new copolymers having unusually high tensile strength and unusually high elongations at the break point.

In accordance with this invention it has been found that any hydrocarbon diene may be used, and particularly those having the structural formula:

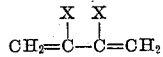

wherein X is a radical of the group consisting of methyl and hydrogen. Thus, new synthetic rubber compositions are preferably prepared from isoprene, butadiene-1,3 and 2,3-dimethyl butadiene.

In accordance with this invention the hydrocarbon dienes of the class above identified are copolymerized with para- or meta-isopropenylbiphenyl. Useful copolymers are those made by the copolymerization of 40 to 90 percent by weight of the diene and from 10 to 60 percent of the isopropenylbiphenyl.

The isopropenylbiphenyls may be prepared from phenylacetophenone by reaction with a methyl magnesium halide to form the α,α-dimethylphenylbenzyl alcohols which is readily converted to the isopropenylbiphenyls by catalytic dehydration. The isopropenylbiphenyls may also be prepared by reacting the biphenyl magnesium halides with acetone and thereafter dehydrating the compounds so prepared. The first step of the reaction is conducted by the well known Grignard synthesis. It has been found that the second step is most effectively conducted in the vapor phase in the presence of a solid catalyst providing an extended surface, such as in alumina, silica, aluminum phosphate, aluminum silicate, sodium bisulfate, calcium bisulfate, calcium phosphate, boron carbide, or aluminum carbide. Generally temperatures should be above 225° C., and preferably between 250 and 320° C.

The meta- and para-isopropenylbiphenyls have physical properties which adapt them for use in the preparation of synthetic rubber by copolymerization with hydrocarbon dienes. In this respect it is quite different from the ortho-isopropenylbiphenyl which does not undergo copolymerization by any of the usual methods of synthetic rubber preparation.

The copolymerizations of para- and meta-isopropenylbiphenyls with the hydrocarbon dienes are preferably effected in aqueous emulsion in the presence of an oxygen yielding catalyst, such as sodium perborate, hydrogen peroxide, sodium persulfate, and other peroxy compounds, or salts of peroxy acids having the molecular grouping (—O—O—). It is usually desirable to use from 0.005 to one percent by weight of the peroxy compound. The aqueous emulsions may be stabilized by the presence of a small amount, for example from one to 5 percent by weight of a substance having both hydrophobic and hydrophilic radicals, such as rosin soap, sulfonated hydrocarbons, water soluble salts of sulfuric acid esters of long chain alkyl alcohols, the salts of the sulfonated alkyl benzenes, triethanolamine and other amino soaps, the water soluble salts of the high molecular weight fatty acids including the mixtures thereof obtained by the saponification of animal and vegetable fats and other compounds having both water repellant groups and groups which promote water solubility.

The polymerizations may be conducted by charging the mixed monomers, water, peroxy catalyst, and emulsifying agent into a suitable reactor which is provided with a means for agitating the reaction mass. The agitation may be accomplished by tumbling the reactor, by stirring the contents with a suitable rotary stirring mechanism, or by any other means which promotes the intimate contact between monomer and the various reagents charged to the vessel. During the reaction the vessel and its contents are maintained at a temperature between 30 and 80° C., for the purpose of inducing a rapid polymerization. Since the polymerization reaction evolves heat, care should be taken to avoid excessive temperatures and reaction rates such that the heat of polymerization cannot be removed from the reaction vessel. The temperature of polymerization should be so controlled that a uniform rate of polymerization is achieved throughout the reaction. When the polymerization is complete, or substantially complete, the emulsion is precipitated by the addition of water soluble salts, acids or alcohols, or any other substance which destroys the effectiveness of the emulsifying agent and permits the separation of aqueous liquor from the solid particles of copolymer by filtration. The copolymer may then be pressed into suitable sized cakes for storage or further processing. The new rubber is compounded with the usual vulcanizing agents, for example antioxidants, accelerators and pigments by milling in any conventional manner, for example on roll mills or in Banbury mixers.

The new compositions may also be prepared by the conventional "cold process" involving a "Redox" polymerization method. These polymerizations are conducted at room temperature or at temperatures below room temperatures, for example 0° C., through the use of sodium bisulfite or other salt of an oxygen acid of a non-metal, the non-metal is in the lower of two valent forms and capable of ready oxidation to the higher valent form. This oxidation is believed to induce the formation of free radicals which promote polymerization at lower temperatures than are possible in conventional synthetic rubber polymerization. In general this "Redox" polymerization process produces rubbers of higher molecular weight and superior physical properties than are otherwise prepared.

The new compositions may be used in any of the conventional rubber applications, and are especially suited where high tensile strength and elongation are required. Methods of compounding and use are well known in the art.

Further details of the preparation are set forth with respect to the following examples.

EXAMPLE 1

A stainless-steel, glass-lined reactor adapted to be tumbled by rotation on an axis perpendicular to the long dimension was charged with 200 parts by weight of a mixture consisting of 75 percent by weight of butadiene and 25 percent by weight of para-isopropenylbiphenyl, 500 parts of water containing 10 parts of soap, 1 part of potassium persulfate and 1.4 part of dodecyl mercaptan. The emulsion was polymerized by heating to 50° C. for sixteen hours with continuous agitation. At the end of this time, 2 parts of an antioxidant, the reaction product of para-aminobiphenyl and acetone was added to the product, and latex was coagulated with an aqueous solution of acetic acid, aluminum sulfate, and sodium chloride. There was obtained a 94 percent yield of a soft, rubbery material, which was then prepared for processing by washing free of emulsifier and drying under reduced pressure for sixteen hours at a temperature of 45° C.

One hundred parts of the purified copolymer thus obtained was milled with 40 parts of a carbon black, 3 parts of zinc oxide, 1 part of stearic acid, 1.75 parts of sulfur, 1 part of a condensate product of acetone and para-aminobiphenyl and 1.2 parts of a rubber vulcanization accelerator, a condensation product of mercaptobenzothiazole with cyclohexylamine, and the compounded material was cured by heating it for sixty minutes at a temperature of 142° C. The following evaluations were obtained upon the cured product:

Shore hardness _____ 60
Young's modulus of elasticity at 300% elongation _____ 660
Tensile strength, p. s. i. _____ 2190
Percent elongation _____ 620

When a curing time of ninety minutes, instead of sixty minutes, was employed at a temperature of 142° C., the following evaluation data were obtained with the para-isopropenylbiphenyl-butadiene copolymer of this example:

Shore hardness _____ 59
Young's modulus of elasticity at 300% elongation _____ 655
Tensile strength, p. s. i. _____ 2050
Percent elongation _____ 610

The above values were obtained at a temperature of 25° C., following the procedures described in Specification D-412-41, found on pages 36-42 of the 1944 edition of the American Society for Testing Materials Standards on Rubber Products.

It has been quite generally known for some time that the stress-strain properties of the vulcanized butadiene (75)-styrene (25) copolymer fall off appreciably as the temperature is increased. Thus, at a temperature of only 100° C., which is not above that developed under operating conditions in pneumatic tires, the strength of the vulcanized copolymer of butadiene (75) and styrene (25) is much less than its strength at room temperature. However, the stress-strain data for the present para-isopropenylbiphenyl-butadiene copolymer at 100° C. are not appreciably different than those data obtained at 25° C. This may be seen from the evaluation data given below, which data were obtained by testing the stress-strain properties at a temperature of 100° C. of the present para-isopropenylbiphenyl-butadiene rubber. The testing methods were those described above.

Young's modulus of elasticity at 300% elongation _____ 535
Tensile strength, p. s. i. _____ 2220
Percent elongation _____ 670

The above data were obtained on the para-isopropenylbiphenyl-butadiene rubber which had been cured at a temperature of 142° C. for sixty minutes. Evaluation data, determined at 100° C. for the rubber which had been cured at a temperature of 142° C. for a period of ninety minutes follows:

Young's modulus of elasticity at 300% elongation _____ 570
Tensile strength, p. s. i. _____ 1655
Percent elongation _____ 550

The flex-cracking property of the 90-minute cured product is also of importance and was determined. This was done by measuring the rate of growth of a 3/32" slit cut in the center of a standard India Flexing specimen (Torrance and Peterson, India Rubber World 80, 62 (1929)). Measurement was made in 64ths of an inch until failure. The speed of the rotor was approximately ten cycles per second. An atmosphere of air maintained at 90° C. was provided by means of resistance heaters within an insulated container enclosing the entire rotating mechanism. The air was sufficiently circulated by the fanning action of the specimens on the periphery of the wheel to assure an even temperature throughout the enclosure. Evaluation for flex-cracking at a temperature of 90° C., gave a value of 25 kilocycles (to failure).

For purposes of comparison, a styrene 25-butadiene 75 copolymer was prepared and compounded in the same manner as described above for the para-isopropenylbiphenyl-butadiene copolymer and the cured products were submitted to the same evaluations. The following data were obtained:

*60' cure at 142° C., tested at 25° C.*

| | |
|---|---|
| Modulus of elasticity at 300% elongation | 830 |
| Tensile strength, p. s. i. | 1660 |
| Percent elongation | 505 |
| Shore hardness | 60 |

*90' cure at 142° C., tested at 25° C.*

| | |
|---|---|
| Modulus of elasticity at 300% elongation | 845 |
| Tensile strength, p. s. i. | 1710 |
| Percent elongation | 495 |
| Shore hardness | 59 |

*60' cure at 142° C., tested at 100° C.*

| | |
|---|---|
| Modulus of elasticity at 300% elongation | 735 |
| Tensile strength, p. s. i. | 735 |
| Percent elongation | 300 |

*90' cure at 142° C., tested at 100° C.*

| | |
|---|---|
| Modulus of elasticity at 300% elongation | --- |
| Tensile strength, p. s. i. | 440 |
| Percent elongation | 230 |

Evaluation for flex-cracking at a temperature of 90° C. for the butadiene (75)-styrene (25) product gave a value of less than seven kilocycles to failure.

Accordingly, the para-isopropenylbiphenyl-butadiene rubber possesses stress-strain and flex-cracking properties that are definitely superior to those of the styrene (25)-butadiene (75) product. Since the latter has very poor stress-strain properties at 100° C., it is obvious that this copolymer is inferior under the conditions developed in service as a tread stock for pneumatic tires. On the other hand, the properties of the isopropenylbiphenyl copolymer even after aging for twenty-four hours at a temperature of 100° C. are essentially as good as those of the unaged styrene copolymer at 25° C. Moreover, because one of the drawbacks of the butadiene-styrene copolymer is its poor flex-cracking resistance, it is evident that our new copolymer, whose flex-cracking resistance is almost four times that of the styrene copolymer, possesses exceptionally valuable properties in this respect.

EXAMPLE 2

The procedures of Example 1 were duplicated except that a mixture of 10 percent meta- and 90 percent para-isopropenylbiphenyls was used in place of para-isopropenylbiphenyl. The mixture was that prepared by propylation of biphenyl, separation of a readily obtainable mixture of the para- and meta-isomers, and dehydrogenation to the corresponding mixture of isopropenylbiphenyls. The rubber so produced was slightly inferior to the pure para-isopropenylbiphenyl but showed up favorably when compared to copolymers of styrene and butadiene.

EXAMPLE 3

Preparations of small lots of rubbers from ortho-isopropenylbiphenyl and pure meta-isopropenylbiphenyl were attempted. The meta-isopropenylbiphenyl was found to copolymerize readily with butadiene-1,3 but the ortho-isomer did not polymerize.

This application is a continuation-in-part of abandoned application Serial No. 573,811, filed by Raymond B. Seymour and David T. Mowry on January 20, 1945.

The invention is defined by the following claims.

We claim:

1. A copolymer of 40 to 80 percent by weight of a compound of the group consisting of meta-isopropenylbiphenyl and para-isopropenylbiphenyl and 10 to 60 percent of a compound having the structural formula:

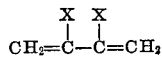

wherein X is a radical of the group consisting of hydrogen and methyl.

2. A copolymer of 40 to 90 percent by weight of a hydrocarbon diene and 10 to 60 percent of para-isopropenylbiphenyl.

3. A copolymer of 40 to 90 percent by weight of butadiene-1,3 and 10 to 60 percent of para-isopropenylbiphenyl.

4. A copolymer of 40 to 90 percent by weight of isoprene and 10 to 60 percent of para-isopropenylbiphenyl.

5. A copolymer of 40 to 90 percent by weight of butadiene-1,3 and from 10 to 60 percent of a mixture of para-isopropenylbiphenyl and meta-isopropenylbiphenyl.

DAVID T. MOWRY.
RAYMOND B. SEYMOUR.

REFERENCES CITED

The following references are of record in the file of this patent:

UNITED STATES PATENTS

| Number | Name | Date |
|---|---|---|
| 2,383,921 | Soday | Aug. 28, 1945 |